(12) United States Patent
Wada et al.

(10) Patent No.: US 10,941,905 B2
(45) Date of Patent: Mar. 9, 2021

(54) PRESSURE ACCUMULATION CONTAINER

(71) Applicants: THE JAPAN STEEL WORKS, LTD., Tokyo (JP); TOKYO DENKI UNIVERSITY, Tokyo (JP)

(72) Inventors: Yoru Wada, Muroran (JP); Yusuke Yanagisawa, Muroran (JP); Hirokazu Tsuji, Tokyo (JP)

(73) Assignees: THE JAPAN STEEL WORKS, LTD., Tokyo (JP); TOKYO DENKI UNIVERSITY, Tokyo (JP)

( * ) Notice: Subject to any disclaimer, the term of this patent is extended or adjusted under 35 U.S.C. 154(b) by 315 days.

(21) Appl. No.: 16/077,296

(22) PCT Filed: Feb. 10, 2017

(86) PCT No.: PCT/JP2017/005019
§ 371 (c)(1),
(2) Date: Aug. 10, 2018

(87) PCT Pub. No.: WO2017/138662
PCT Pub. Date: Aug. 17, 2017

(65) Prior Publication Data
US 2019/0049069 A1 Feb. 14, 2019

(30) Foreign Application Priority Data
Feb. 12, 2016 (JP) .............................. JP2016-024393

(51) Int. Cl.
*F17C 13/06* (2006.01)
*F16J 13/12* (2006.01)
(Continued)

(52) U.S. Cl.
CPC .............. *F17C 13/06* (2013.01); *F16J 12/00* (2013.01); *F16J 13/12* (2013.01); *F17C 1/00* (2013.01);
(Continued)

(58) Field of Classification Search
CPC .... F17C 13/06; F17C 1/00; F17C 2203/0648; F17C 2223/0123; F17C 2203/0675;
(Continued)

(56) References Cited

U.S. PATENT DOCUMENTS 3,055,537 A 9/1962 Watts
3,419,180 A 12/1968 Homrig et al.
(Continued)

FOREIGN PATENT DOCUMENTS

AU 591771 B2 12/1989
DE 1051253 B 2/1959
(Continued)

OTHER PUBLICATIONS

Communication dated Sep. 29, 2019, from the State Intellectual Property Office of People's Republic of China in counterpart Application No. 201780010914.8.
(Continued)

*Primary Examiner* — Chun Hoi Cheung
*Assistant Examiner* — Brijesh V. Patel
(74) *Attorney, Agent, or Firm* — Sughrue Mion, PLLC

(57) ABSTRACT

An accumulator vessel (10) includes a screwable portion (3) and a lid portion (2) that is positioned at an axially inner side of the screwable portion and an axially inner surface configures a pressure bearing plane. The lid portion includes a protruding portion (22) extending axially outward on an inner circumferential side, and the protruding portion configured to abut against an axially inner end side of the screwable portion to separate an axially inner surface of the screwable portion on an outer circumferential side thereof apart from an axially outer surface of the lid portion on an outer circumferential side thereof.

12 Claims, 7 Drawing Sheets

(51) Int. Cl.
*F16J 12/00* (2006.01)
*F17C 1/00* (2006.01)

(52) U.S. Cl.
CPC . *F17C 2201/0119* (2013.01); *F17C 2201/058* (2013.01); *F17C 2203/0617* (2013.01); *F17C 2203/0619* (2013.01); *F17C 2203/0639* (2013.01); *F17C 2203/0648* (2013.01); *F17C 2203/0665* (2013.01); *F17C 2203/0673* (2013.01); *F17C 2203/0675* (2013.01); *F17C 2205/0305* (2013.01); *F17C 2205/0311* (2013.01); *F17C 2209/234* (2013.01); *F17C 2221/012* (2013.01); *F17C 2223/0123* (2013.01); *F17C 2223/036* (2013.01); *F17C 2260/036* (2013.01); *F17C 2265/066* (2013.01); *F17C 2270/0168* (2013.01); *F17C 2270/0184* (2013.01); *Y02E 60/32* (2013.01)

(58) Field of Classification Search
CPC ........ F17C 2223/036; F17C 2205/0305; F17C 2203/0619; F17C 2201/058; F17C 2203/0617; F17C 2270/0184; F17C 2203/0639; F17C 2265/066; F17C 2203/0665; F17C 2209/234; F17C 2260/036; F17C 2201/0119; F17C 2203/0673; F17C 2205/0311; F17C 221/012; F17C 2270/0168; F17C 1/06; F17C 2203/012; F17C 2209/228; Y02E 60/32; F16B 5/02; F16J 13/12; F16J 12/00
USPC ............ 220/582, 254.1, 254.3, 254.4, 254.8, 220/256.1, 288, 361, 601, 661; 138/96 T; 277/628, 637; 53/317, 319, 404, 488–489
See application file for complete search history.

(56) References Cited

U.S. PATENT DOCUMENTS

| | | | | |
|---|---|---|---|---|
| 3,606,348 A * | 9/1971 | Taylor | ................... | F16J 15/008 |
| | | | | 277/328 |
| 4,255,916 A * | 3/1981 | Blankenship | ............. | F17C 5/06 |
| | | | | 53/404 |
| 4,465,201 A * | 8/1984 | Chalfant, Jr. | ............. | G21F 5/12 |
| | | | | 220/582 |
| 4,538,395 A * | 9/1985 | Edmonds | ................... | F17C 5/06 |
| | | | | 53/403 |
| 5,494,188 A * | 2/1996 | Sirosh | ................... | F17C 1/16 |
| | | | | 220/590 |
| 5,832,947 A * | 11/1998 | Niemczyk | ............... | F16K 1/305 |
| | | | | 137/68.23 |
| 8,231,028 B2 * | 7/2012 | Matsuoka | ................ | F16J 13/12 |
| | | | | 220/582 |
| 8,505,762 B2 * | 8/2013 | Holbach | ................... | F17C 13/06 |
| | | | | 220/586 |
| 2005/0006393 A1 * | 1/2005 | Carter | ................... | B29C 70/086 |
| | | | | 220/581 |
| 2013/0082054 A1 | 4/2013 | Groben | | |
| 2013/0112691 A1 | 5/2013 | Lyons et al. | | |
| 2014/0120204 A1 * | 5/2014 | Strack | ..................... | B29C 49/24 |
| | | | | 425/535 |
| 2015/0001229 A1 * | 1/2015 | Helmig | .................. | B29C 49/20 |
| | | | | 220/592 |

FOREIGN PATENT DOCUMENTS

| | | | |
|---|---|---|---|
| DE | 2112161 A1 | | 9/1972 |
| GB | 249001 A | | 3/1926 |
| JP | 55-124658 U | | 9/1980 |
| JP | 60-112750 U | | 7/1985 |
| JP | 63-109070 U | | 7/1988 |
| JP | 63-145058 U | | 9/1988 |
| JP | 3-38458 U | | 4/1991 |
| JP | 5771331 B2 | | 8/2015 |
| JP | 2015-158243 A | | 9/2015 |
| JP | 2015158243 A | * | 9/2015 |
| WO | 2014178092 A1 | | 11/2014 |

OTHER PUBLICATIONS

Harvey, John F. "Pressure Component Construction Design and Materials Application", 1980, Van Norstand Reinhold Company, 4 pages total.

"Standard for Pressure Equipments Containing Ultra High Pressure Gas KHKS (0220) 2010", (Feb. 16, 2010), Published by the High Pressure Gas Safety Institute of Japan, 5 pages total.

Search Report dated May 16, 2017, issued by the International Searching Auhority in International Application No. PCT/JP2 017/0 05019 (PCT/ISA/210).

Written Opinion dated May 16, 2017, issued by the International Searching Auhority in International Application No. PCT/JP2 017/0 05019 (PCT/ISA/237).

Communication dated Oct. 8, 2019, from the Japanese Patent Office in counterpart application No. 2016-024393.

Communication dated Sep. 6, 2019, from the European Patent Office in counterpart European Application No. 17750383.6.

* cited by examiner

[FIG. 4A]
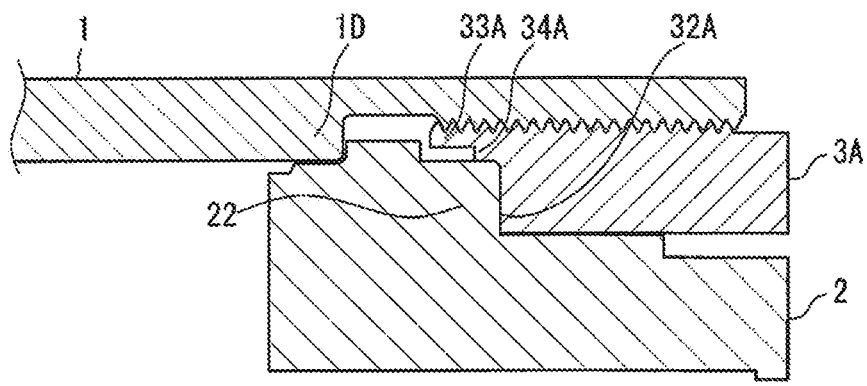
[FIG. 4B]
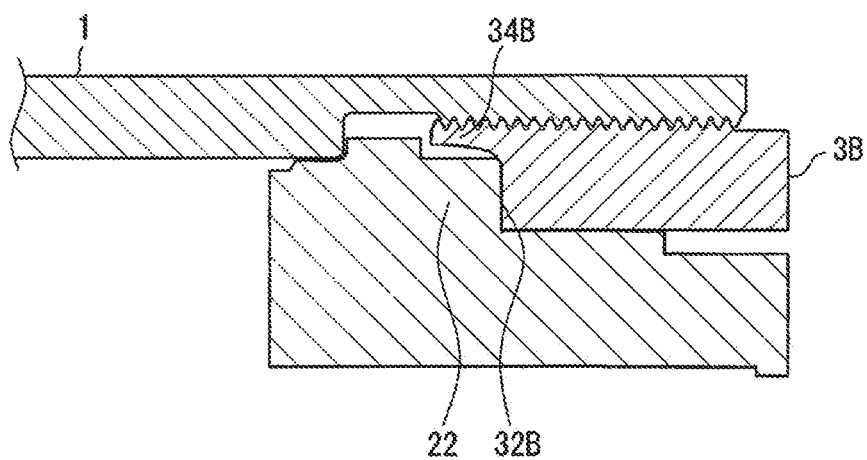

[FIG. 5A]
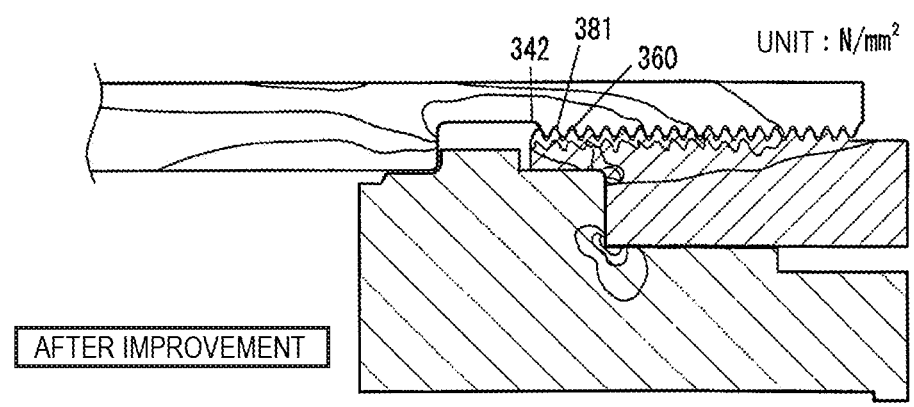
AFTER IMPROVEMENT
[FIG. 5B]
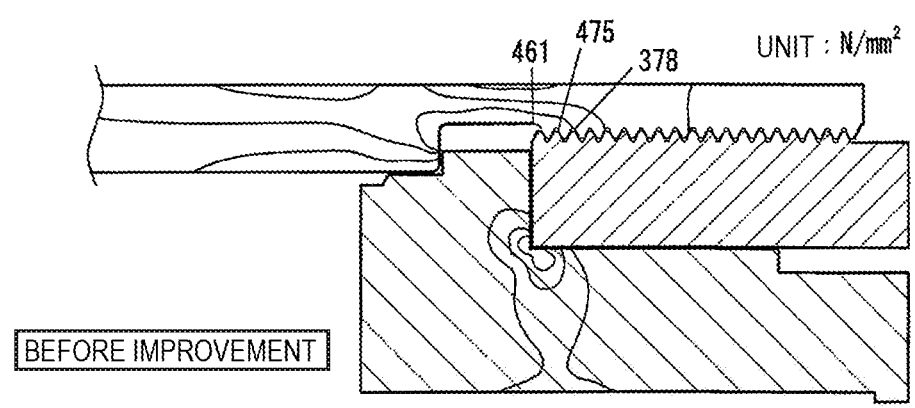
BEFORE IMPROVEMENT

[FIG. 6A]
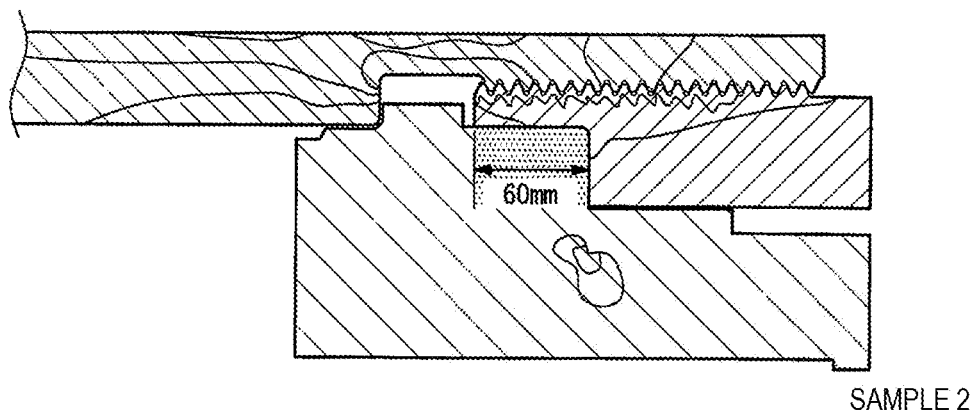
SAMPLE 2
[FIG. 6B]
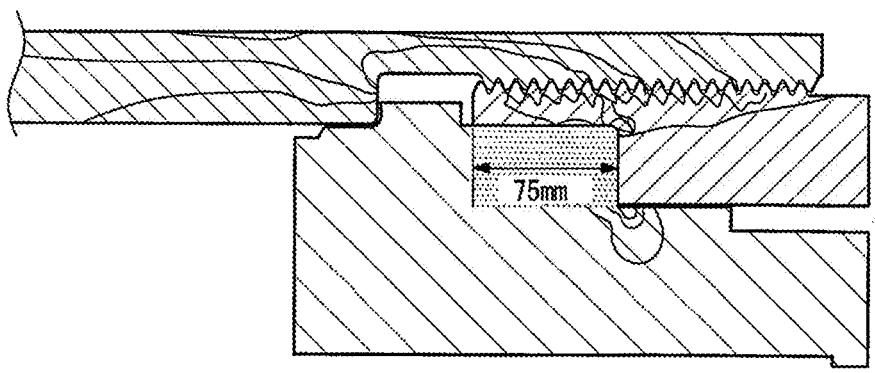
SAMPLE 3
[FIG. 6C]
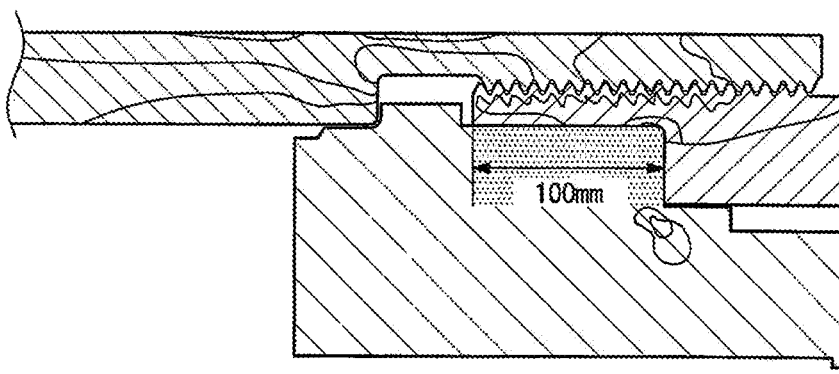
SAMPLE 4

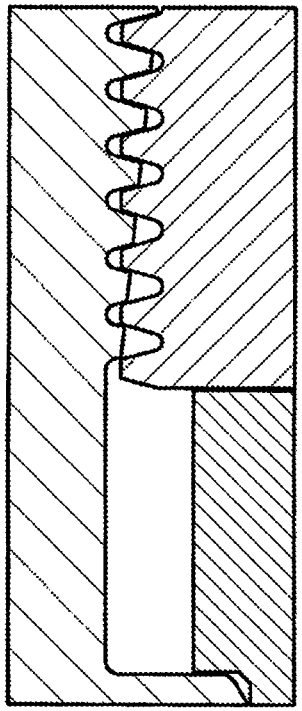
[FIG. 7A]
Mode 11
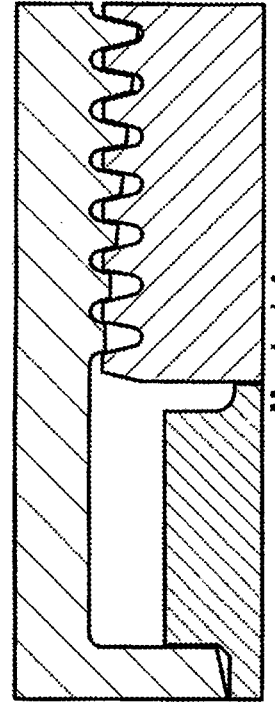
[FIG. 7B]
Mode 12
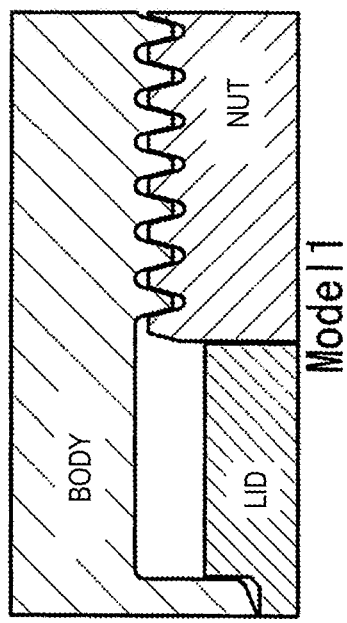
[FIG. 7C]
Mode 13
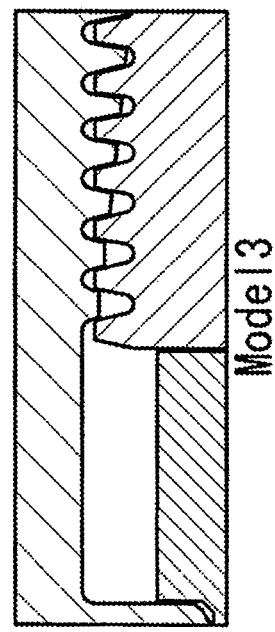
[FIG. 7D]
Mode 14

PRESSURE ACCUMULATION CONTAINER

TECHNICAL FIELD

The present invention relates to an accumulator vessel that can accumulate high-pressure gas such as pressurized hydrogen gas in an interior thereof and in which a lid at an end portion can be opened and closed.

BACKGROUND ART

Conventionally, a high-pressure hydrogen accumulator vessel is used at a hydrogen station, and high-strength low-alloy steel such as Cr—Mo steel is used as a material for such an accumulator vessel. In the event that a crack is generated in an inner surface of the accumulator vessel, hydrogen comes to contact a leading end of the crack to thereby generate hydrogen environmental embrittlement, which accelerates the propagation of the crack, resulting in concerns about a failure of the vessel.

In a general accumulator vessel having an accumulator vessel structure in which a threaded portion where the accumulator vessel is opened and closed is brought into direct contact with hydrogen, hydrogen environmental embrittlement tends to be generated easily at a stress concentrated portion in the threaded portion, and this damages remarkably fail in safety of the accumulator vessel. In the case where other filling substances than hydrogen that make metal brittle by nature are accumulated in the accumulator vessel, there are concerns that a similar phenomenon is produced.

Then, as described in NPLs 1 and 2, a screwable nut type lid structure is adopted in which a threaded portion of an accumulator vessel is prevented from being brought into direct contact with hydrogen filled therein, and adopting this structure can avoid a risk of hydrogen environment embrittlement being generated at roots of threads of the threaded portion, thereby making it possible to enhance further the safety of the accumulator vessel.

CITATION LIST

Non Patent Literature

NPL 1: John F. Harvey, "Pressure Component Construction Design and Materials Application," VAN NORSTAND REINHOLD COMPANY, (1980) P. 382-P. 384

NPL 2: Standard for Ultra High-Pressure Gas Equipment KHKS (0220) 2010," 2010, P. 26 Published by the High Pressure Gas Safety Institute of Japan

SUMMARY OF INVENTION

Technical Problem

In the screwable nut type lid structures described in NPLs 1 and 2, however, when an axial load is exerted on male threads and female threads that mesh with each other, the load is not uniformly distributed over the threads. As a result of this, in the meshing threads, a maximum load is exerted on a first thread, and loads distributed to threads from a second thread onwards gradually reduce. Due to this load distribution, a fatigue crack generated particularly from the first thread is concerned about.

For example, in relation to an accumulator vessel for use for a hydrogen station, the number of times of loading hydrogen in a vehicle is considered to be about 100 times per day. Thus, in case where the accumulator vessel is used for 10 years, a fatigue strength corresponding to hundreds of thousands of times of loading of hydrogen has to be guaranteed. Unless a fatigue strength required on a threaded portion of an accumulator vessel is ensured, the safety of the accumulator vessel cannot be ensured. Thus, there is caused a problem in that the accumulator vessel cannot be used at a hydrogen station without anxiety.

A form of Model 1 shown in FIG. 7 represents the conventional example described above. In relation to the conventional example, it is studied that the "thread overlap" is reduced gradually by reducing the height of threads on a body partially in a tapered fashion to reduce a load distributed to a first thread (Models 2 to 4). In Model 2, the thread overlap is reduced gradually from a first thread in a tapered fashion at a ratio of 1:10. In Model 3, first and second threads are reduced in height, and the thread overlap is reduced gradually from a third thread in a tapered fashion at a ratio of 1:10. In Model 4, the shape of threads is determined in the same way as the way used in Model 3, and a lid is cut out partially.

In Model 1 shown in FIG. 7, the maximum Mises stress is 434 MPa, whereas in Model 2, the maximum Mises stress is 323 MPa, and in Model 3, the maximum Mises stress is 306 MPa. In Model 4, the lid is cut off partially, so that the load is distributed to roots of threads from a third thread onwards, as a result of which the maximum Mises stress can be reduced as low as 296 MPa, which is the smallest maximum Mises stress of the four models. However, a certain working accuracy is required to produce such tapered threads, which increases the production cost. In addition, once the lid is closed, it becomes difficult to open the lid again from the industrial point of view, and hence, the proposed models are not realistic.

The invention has been made in view of these situations, and one of objects thereof is to provide an accumulator vessel having an openable and closeable lid structure that ensures a sufficient fatigue strength and facilitates opening and closing of a lid.

Solution to Problem

The object of the invention is achieved by the following configurations.

(1) An accumulator vessel comprising a cylinder portion, both end portions of the cylinder portion being tightly closed, at least one of the end portions of the cylinder portion configuring an openable and closeable end portion, the openable and closeable end portion being configured to be closed tightly and to be opened and closed, the accumulator vessel comprising:

a female thread formed on an inner circumferential surface of the openable and closeable end portion;

a screwable portion comprising, on an outer circumferential surface thereof, a male thread screwable into the female thread; and a lid portion positioned at an axially inner side of the screwable portion, an axially inner surface of the lid portion configuring a pressure bearing plane, wherein the lid portion comprises an extending portion extending axially outward on an inner circumferential side, the extending portion being configured to abut against an axially inner end side of the screwable portion on an inner circumferential side thereof to separate an axially inner surface of the screwable portion on an outer circumferential side thereof apart from an axially outer surface of the lid portion on an outer circumferential side thereof.

(2) The accumulator vessel according to the above (1), comprising: a stopper provided on the cylinder portion and configured to restrict an axially inward movement of the lid portion at a predetermined position.

(3) The accumulator vessel according to the above (1) or (2), wherein the lid portion comprises: a large diameter portion following an inner circumferential surface of the operable and closeable end portion; and a protruding portion, as the extending portion, positioned radially inward than an outer circumferential surface of the large diameter portion and protruding axially outward of the large diameter portion, and wherein the screwable portion comprises a recessed portion into which the protruding portion fits, the recessed portion having a depth allowing the axially inner surface of the screwable portion to be spaced apart from an axially outer surface of the large diameter portion of the lid portion to provide a gap therebetween with an axially outer surface of the protruding portion kept in abutment with a bottom surface of the recessed portion.

(4) The accumulator vessel according to the above (3), wherein the protruding portion is configured by a small diameter portion.

(5) The accumulator vessel according to the above (3) or (4), wherein the large diameter portion and the protruding portion are separated from each other or integral with each other.

(6) The accumulator vessel according to any one of the above (3) to (5), comprising:

a second protruding portion provided further radially inward than an outer circumferential surface of the protruding portion and extending further axially outward than the protruding portion, wherein the screwable portion comprises a second recessed portion into which the second protruding portion fits.

(7) The accumulator vessel according to the above (6), wherein the second recess portion penetrates the screwable portion.

(8) The accumulator vessel according to the above (6) or (7), wherein a female thread is formed on an inner circumferential surface of the second recessed portion, and wherein the protruding portion comprises, on the outer circumferential surface thereof, a male thread screwable into the female thread of the second recessed portion.

(9) The accumulator vessel according to any one of the above (6) to (8), wherein the second protruding portion is integral with the large diameter portion.

(10) The accumulator vessel according to any one of the above (3) to (9), wherein in a meshing engagement between the female thread of the openable and closeable end portion and the male thread of the screwable portion, a length of the protruding portion is a length corresponding to two or more inner threads of the meshing engagement and 54% or less than a length of the meshing engagement.

(11) The accumulator vessel according to any one of the above (3) to (10).

wherein an outer circumference of the protruding portion is positioned a distance away from an inner circumference thereof for 45% to 80% of a radial thickness (T1), including a height of the male thread, of the screwable portion, and wherein T3 is 180% or greater of a depth of the thread (a distance between a crest and a root of the thread) or 120% or greater of a pitch of the thread.

(12) The accumulator vessel according to any one of the above (1) to (11), wherein the cylinder portion is configured by a straight circular cylindrical portion.

(13) The accumulator vessel according to any one of the above (1) to (12), wherein an outer circumferential surface of the cylinder portion is hooped with a fiber reinforced plastic.

Advantageous Effects of Invention

According to the invention, the opening and closing of the lid at the end portion of the cylinder portion becomes easy. Consequently, an inspection for internal minute cracks can be carried out on an accumulator vessel at the shipment from a factory or at periodical inspections while in use. The screwing structure at the openable and closeable structure of the lid can ensure the resistance to fatigue properties and the fatigue crack propagation properties. When used for an accumulator vessel for use, for example, at a hydrogen station, the accumulator vessel of the invention can be used repeatedly while verifying periodically that no crack exists in the interior thereof, whereby the safety of the accumulator vessel in relation to the remaining service life can be ensured. Consequently, the running cost of the hydrogen station and the accumulator vessel renewal cost can be reduced, contributing further to the spread of the hydrogen society.

BRIEF DESCRIPTION OF DRAWINGS

FIG. 4A is a sectional view showing a structure of a lid portion of an accumulator vessel of a further embodiment of the invention, and FIG. 4B is a sectional view showing a modified example of a peripheral structure of the lid portion around the accumulator vessel shown in FIG. 4A.

FIGS. 5A and 5B are schematic views showing stress distributions of an example of the invention and a comparative example, in which FIG. 5A shows a stress distribution after an improvement and FIG. 5B shows a stress distribution before the improvement.

FIGS. 6A to 6C are explanatory drawings illustrating stress values resulting when a length of a protruding portion is changed, in which FIG. 6A is an explanatory drawing of Sample Material 2, FIG. 6B is an explanatory drawing of Sample Material 3, and FIG. 6C is an explanatory drawing of Sample Material 4.

FIGS. 7A to 7D are sectional views showing the structure of an openable and closeable end portion in a conventional accumulator vessel and modified examples made thereto, in which FIG. 7A is a sectional view of Model 1, FIG. 7B is a sectional view of Model 2, FIG. 7C is a sectional view of Model 3, and FIG. 7D is a sectional view of Model 4.

DESCRIPTION OF EMBODIMENTS

Embodiment 1

Figure 1:
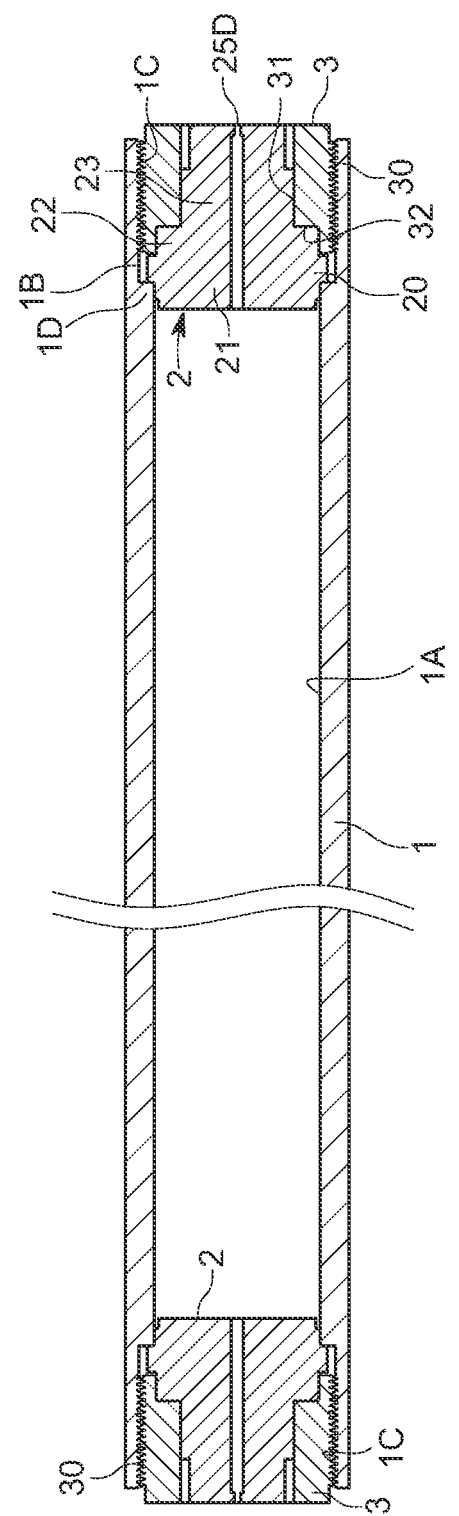
FIG. 1 is a sectional view showing an accumulator vessel of an embodiment of the invention.

An embodiment of the invention will be described as below.

A hydrogen gas accumulator vessel 10 of this embodiment has a circularly cylindrical cylinder portion 1 made of steel, lid portions 2 configured to close tightly end portions of the circularly cylindrical cylinder portion 1 in such a way as to open them as required, and screwable portions 3 where to fix the lid portions 2 in place in the circularly cylindrical cylinder portion 1. The hydrogen gas accumulator vessel 10 corresponds to an accumulator vessel of the invention. Additionally, in this embodiment, both the end portions of the circularly cylindrical cylinder portion 1 are openable and closeable end portions.

A Mannesmann-type vessel in which both end openings are tighten or an Ehrhardt-type seamless vessel (a so-called bomb) is used sometimes as a conventional hydrogen gas accumulator vessel. However, in these conventional accumulator vessels, since the opening portions are small, cracks in an inner surface cannot be inspected for directly, and hence, a presence or absence of crack cannot be verified sufficiently. Consequently, the safety of an accumulator vessel cannot be ensured at the time of shipment from a factory or while in use.

In contrast with the conventional accumulator vessels, in the hydrogen gas accumulator vessel 10 of this embodiment, the end portions of the circularly cylindrical cylinder portion 1 are formed into bore portions 1B whose bore diameter is greater than a bore diameter of the remaining portion of the circularly cylindrical cylinder portion 1 that is defined by an inner surface 1A thereof, and the end portions can be opened and closed by the lid portions 2, this facilitating a crack inspection on the inner surface.

In addition, materials for the circularly cylindrical cylinder portion 1, the lid portions 2 and the screwable portions 3 are not particularly limited. Manganese steel, chromium molybdenum steel, nickel chromium molybdenum steel or other low-alloy steels (excluding stainless steel) can be used as a material for the circularly cylindrical cylinder portion 1, for example. These materials have high tensile strength and hence provide high vessel strength. The same material as the material of the circularly cylindrical cylinder portion 1 may be used as a material for the lid portions 2 and the screwable portions 3. Alternatively, the lid portions 2 and the screwable portions 3 may be made of other materials. Further, different materials can also be used for constituent members of the lid portions 2 and the screwable portions 3.

The circularly cylindrical cylinder portion 1 is formed of steel and has a straight cylindrical shape. Although there is imposed no specific limitation on fabricating methods thereof, it is desirable to adopt a working method with few drawbacks. The circularly cylindrical cylinder portion 1 is formed into an integral unit through, for example, forging or extrusion.

It is desirable that the inner surface 1A of the circularly cylindrical cylinder portion 1 is mirror finished to be free from cracks or flaws. The bore of the circularly cylindrical cylinder portion 1 is formed into a straight cylindrical shape at the portion defined by the inner surface 1A, and hence, the mirror finishing can easily be applied thereto. The inner surface 1A constitutes a portion on which the pressure of pressurized hydrogen is exerted.

A surface configuration that is made free from a crack having a depth of 0.5 mm or greater in a thickness direction and a surface length of 1.6 mm or greater in an ensured fashion can be imparted to the inner surface 1A through mirror finishing to prevent a development or propagation of crack that would be caused by hydrogen embrittlement. In the event that a crack greater than the size defined above remains on the inner surface of the circularly cylindrical cylinder portion 1, the remaining crack tends to be developed or propagated easily by hydrogen embrittlement, deteriorating the fatigue crack life.

The circularly cylindrical cylinder portion 1 has the bore portion 1B formed at axial ends thereof, and the bore diameter of the bore portions 1B is greater than the bore diameter of the remaining portion of the circularly cylindrical cylinder portion 1 that is defined by the inner surface 1A. A female thread portion 1C is formed on an inner surface of the bore portion 1B excluding a portion of an axially inner side thereof for making screw engagement with the screwable portion 3. The screwable portion 3 has, on an outer circumferential surface thereof, a male thread portion 30 screwed into the female thread portion 1C. Although a screwing structure of the circularly cylindrical cylinder portion 1 is the same at both the end portions thereof, it is possible to use different screwing structures at the end portions.

The lid portion 2 is positioned axially further inward than the screwable portion 3. The lid portion 2 includes: a large diameter portion 20 that abuts on an axially inner surface of the circularly cylindrical cylinder portion 1; and an inner shaft portion 21, which is contiguous with an axially inner side of the large diameter portion 20, and which defines a small gap between the inner surface 1A and the inner shaft portion 21. A seal portion can be provided between the inner surface 1A and the inner shaft portion 21 as required.

In an axial predetermined position where the large diameter portion 20 is located, an outer end of the inner surface 1A is positioned at an axially inner side to abut with an inner surface of the large diameter portion 20 to thereby restrict an inward movement of the large diameter portion 20. Consequently, the outer end of the inner surface 1A corresponds to a stopper 1D of the invention.

A coaxial protruding portion 22 is provided at an axially outer side of the large diameter portion 20, and this protruding portion 22 is smaller in diameter than the large diameter portion 20 and has a circularly cylindrical shape. The protruding portion 22 corresponds to an extending portion of the invention. Although the protruding portion 22 is described as having the circularly cylindrical shape in this embodiment, there is imposed no specific limitation on the configuration of the protruding portion 22, that is, the extending portion. Additionally, the protruding portion 22 may be made up of a plurality of members.

In addition, a coaxial shaft portion 23, having a circularly cylindrical shape and being smaller in diameter than the protruding portion, is provided on the axially outer side of the large diameter portion 20 so as to extend axially outward. The protruding portion 22 may be integral with the large diameter portion 20 or may be separate from the large diameter portion 20. Herein, the protruding portion 22 is described as being integral with the large diameter portion 20. A hydrogen passage hole 25D is formed in the lid portion 2 so as to extend from the large diameter portion 20 to the shaft portion 23 in such a way as to penetrate the lid portion 2 in the axial direction. The shaft portion 23 corresponds to a second protruding portion of the invention. In this embodiment, the shaft portion 23 is described as having the circularly cylindrical shape. There is imposed no specific limitation on the configuration of the shaft portion 23, that is, the second protruding portion. Additionally, the shaft portion 23 may be made up of a plurality of members.

On the other hand, the screwable portion 3 has formed therein a through hole 31 that the shaft portion 23 penetrates. The screwable portion 3 has further a circularly cylindrical recessed portion 32 formed at an axially inner side thereof, so that the protruding portion 22 fits therein. The through hole 31 corresponds to a second recessed portion of the invention.

Figure 2A:
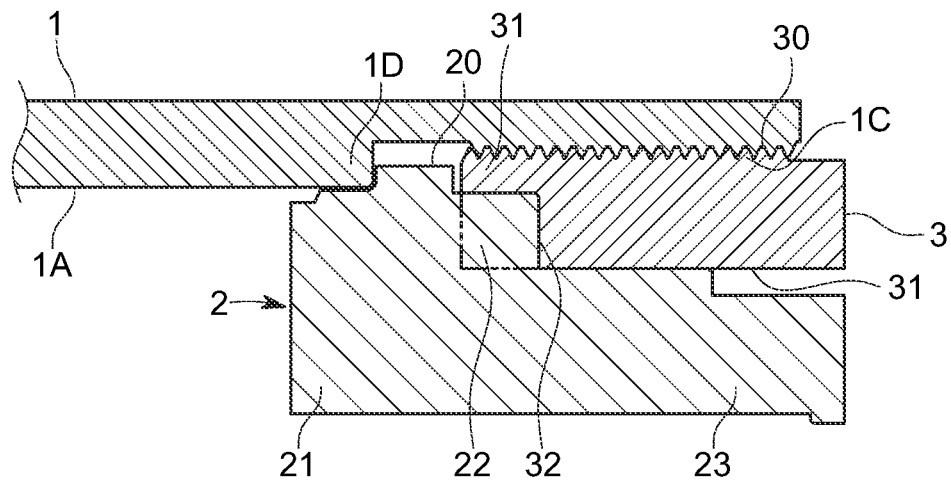
FIG. 2A is a sectional view showing a peripheral structure of a lid portion of the accumulator vessel of the embodiment of the invention.
Figure 2B:
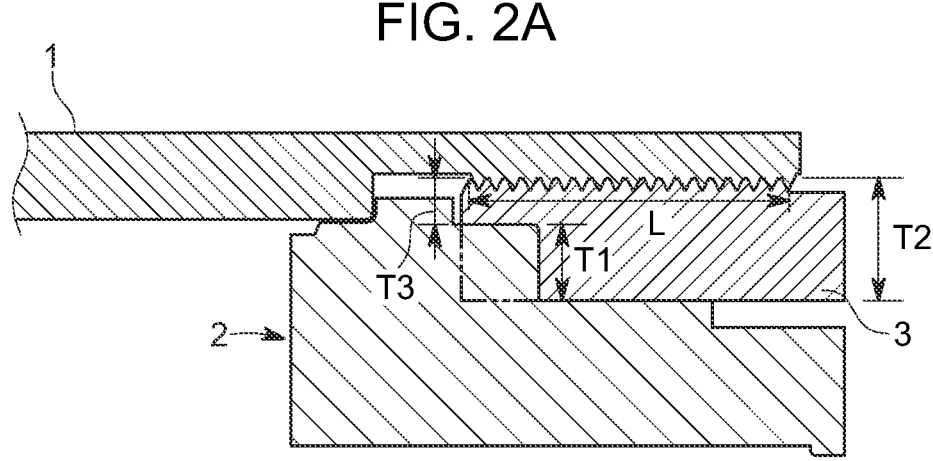
FIG. 2B is a sectional view showing respective dimensions of peripheral portions of the lid portion around the accumulator vessel.

With an axial distal end face of the protruding portion 22 kept in abutment with a bottom surface of the recessed portion 32, the recessed portion 32 is spaced apart from an axially inner distal end face of the screwable portion 3 and an axially outer distal end face of the large diameter portion 20 without contacting them to thereby define a gap therebetween. A contact width of the protruding portion 22 with the recessed portion 32 is denoted by T1 in FIG. 2B.

Additionally, when the screwable portion 3 is screwed into a predetermined position, the axially inner surface of the large diameter portion 20 comes into abutment with the stopper 1D, whereby the large diameter portion 20 is restricted from moving further.

In addition, a female thread may be formed on an inner surface of the screwable portion 3, and a male thread may be formed on an outer circumferential surface of the shaft portion 23 so that the screwable portion 3 and the shaft portion 23 are screwed together.

In a meshing engagement between a female thread portion 1C and a male thread portion 30 of the screwable portion 3, a length of the protruding portion 22 is desirably a length corresponding to two or more threads within the meshing engagement and 54% or smaller than a length L (refer to FIG. 2B) of the meshing engagement. In the case where the length of the protruding portion 22 is too short, the effect of the protruding portion 22 becomes small. On the other hand, although the effect of the protruding portion 22 becomes greater as the protruding portion 22 extends longer, in the case where the length of the protruding portion 22 becomes too long, the stress reducing effect of the protruding portion 22 becomes saturated.

Additionally, an outer circumferential position of the protruding portion 22 is positioned a distance away from an inner circumferential side that corresponds to 45% to 80% of a radial thickness (denoted by T2 in FIG. 2B), including a height of the male thread, of the screwable portion. In the case where the outer circumferential position of the protruding portion 22 is close to the male threads of the screwable portion 3 (of the order of 80% of T2), a stress distribution in the vicinity of a root of the thread is affected. In the case where the outer circumferential position of the protruding portion 22 is far from the male threads (less than 45% of T2), the effect of reducing a load distribution on a first thread is reduced.

In the case where a thickness of a ligament portion 33 (an outer circumferential thickness situated on an outer side of the protruding portion 22 including the male threads of the screwable portion 3: a thickness of a portion denoted by T3) is too thin, there is caused a problem in that the protruding portion 22 may be deformed when the protruding portion 22 is hit by a workpiece. Due to this, the thickness (denoted by T3 in FIG. 2B) of the ligament portion 33 is desirably 180% or greater of a height of the thread (a distance between a crest and a root of the thread) or 120% or greater of a pitch of the thread.

On the other hand, in the case where the outer circumferential position of the protruding portion 22 is situated nearer to the inner circumferential side, following that the diameter of the protruding portion 22 becomes smaller, it becomes difficult to obtain the effect of the protruding portion 22.

In this embodiment, an autofrettaging treatment can be applied to the circularly cylindrical cylinder portion 1 by applying a high pressure from an inner surface side thereof. When applying the autofrettaging treatment to the circularly cylindrical cylinder portion 1, the circularly cylindrical cylinder portion 1 expands in an outer circumferential direction, causing a plastic deformation on an inner circumferential side thereof, whereby a residual stress remains therein to thereby increase the strength thereof. On the other hand, an elastic deformation area is produced on an outer circumferential side of the circularly cylindrical cylinder portion 1.

The hydrogen gas accumulator vessel configured in the way described above can be machined accurately by having the circularly cylindrical cylinder portion 1, enabling a quality management that is sufficient to prevent a generation of machining crack having a depth of 0.5 mm or greater.

In addition, an internal inspection can also be carried out easily and accurately by removing the lid portions 2, as a result, a quality accuracy improves. After the inspection is finished, the lid portions 2 can easily be mounted again on the circularly cylindrical cylinder portion 1, whereby the accumulator vessel can be restored to the usable condition. Thus, the workload is also reduced.

In an openable and closeable lid structure of this embodiment, the stress of an internal pressure is never transmitted directly from the large diameter portion 20 of the lid portion 2 to the screwable portion 3. The stress of the internal pressure is transmitted to the screwable portion 3 by way of the protruding portion 22 and a bottom surface of the recessed portion 32 in a position situated further outward than an axially inner end of the screwable portion 3. As a result of this, a maximum load is never exerted on a first thread, and the load can be transmitted over the whole of threads as uniformly as possible.

The hydrogen gas accumulator vessel of this embodiment can be used for a hydrogen station where hydrogen is supplied to a motor vehicle using hydrogen as a fuel.

The accumulator vessel of this embodiment can be used, for example, as an accumulator vessel for a hydrogen station (a compressed hydrogen filling station) where hydrogen of the order of 70 MPa is supplied to a fuel cell hydrogen vehicle. For example, when assuming that 65 vehicles are filled thereat a day, the accumulator vessel is subjected to the inside pressure repeatedly 20,000 times a year and 400,000 times for 15 years. To ensure a durability withstanding such a use, with the accumulator vessel of this embodiment, the high strength and light weight structure is realized, and when used at a hydrogen station set in an urban area, the accumulator vessel of this embodiment can provide absolute safety and high reliability. Moreover, the resistance to fatigue properties can be improved without increasing the number of parts involved and with the costs and mass suppressed to the same levels as those before improvement.

Additionally, the lid portions 2 can be opened and closed by removing and remounting the screwable portions 3, and hence, the inside inspection can easily be carried out.

Consequently, an inspection can be carried out on the inner surface for minute cracks, and the lids can be opened and closed easily and simply in a repeated fashion every time a periodical inner surface crack inspection is carried out.

Embodiment 2

Figure 3:
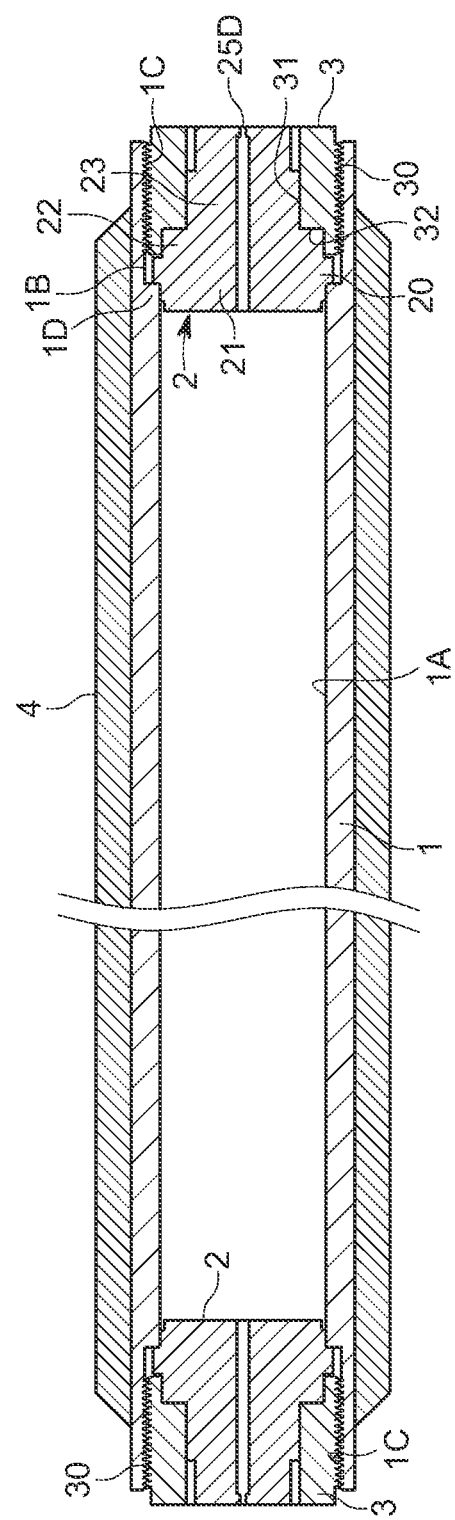
FIG. 3 is a sectional view showing an accumulator vessel of another embodiment of the invention.

As shown in FIG. 3, an outer circumferential side of a circularly cylindrical cylinder portion 1 can be hooped with a fiber reinforced plastic 4. The other configurations are remain the same as those of Embodiment 1, and like reference numerals will be given to like portions to those of Embodiment 1, omitting a repeated description thereof.

As this occurs, there is imposed no specific limitation on the types fiber or plastic material to be used in this invention. For example, carbon fiber can be used as fiber for reinforcement, and epoxy resin or the like can be used as plastic material for covering. It is desirable to use a continuous fiber as fiber for reinforcement. There is imposed no specific limitation on the thickness of fiber to be used, either, and the thickness of fiber to be used can be determined in relation to a strength required. In the invention, the outer circumferential side of the circularly cylindrical cylinder portion 1 may not be hooped with the fiber reinforced plastic.

To hoop the circularly cylindrical cylinder portion 1 with the fiber reinforced plastic, a thermosetting plastic is wound around the circularly cylindrical cylinder portion 1 made of a circularly cylindrical steel material while being impregnated with a fiber and is then heated to a predetermined temperature to have the plastic set. In heating the plastic, the circularly cylindrical cylinder portion 1 is also heated, whereby the circularly cylindrical cylinder portion 1 is caused to expand and contract.

Additionally, an autofrettaging treatment can be applied to the circularly cylindrical cylinder portion 1 by applying a high pressure from an inner surface side thereof. When the autofrettaging treatment is applied thereto, the circularly cylindrical cylinder portion 1 expands in the outer circumferential direction while it is plastically deformed on the inner circumferential side thereof, whereby a residual stress remains therein, increasing the strength of the circularly cylindrical cylinder portion 1. On the other hand, an elastic deformation area is produced on the outer circumferential side of the circularly cylindrical cylinder portion 1. As this occurs, an outer circumferential or outside diameter of the circularly cylindrical cylinder portion 1 expands to eliminate the gap defined between the circularly cylindrical cylinder portion 1 and the fiber reinforced plastic 4, whereby the circularly cylindrical cylinder portion 1 is brought into tight contact with the fiber reinforced plastic 4. This can not only ensure the desired strength but also suppress the deformation of the circularly cylindrical cylinder portion 1 when hydrogen is stored therein under pressure, thereby making it possible to enhance the durability of the accumulator vessel.

Embodiment 3

In Embodiments 1, 2, the ligament portion and the protruding portion 22 are described as being positioned on planes that are radially almost identical, however, the ligament portion and the protruding portion 22 may be disposed so that a clear gap is defined between an outer circumferential surface of the protruding portion 22 and an inner circumferential surface of the ligament portion.

FIG. 4A shows that a ligament portion of a screwable portion 3A has a thin inner ligament portion 33A and a thick ligament portion 34A. In this embodiment, too, the protruding portion 22 can be brought into contact with a recessed portion of the screwable portion 3A. Although the ligament portion is described as having the two-staged configuration in this embodiment, the number of stages may be increased further. In addition, the ligament portion is described as having the structure in which part of the ligament portion is in contact with or lies near the protruding portion 22, however, the ligament portion may be configured so that a clear gap is defined between the whole of the ligament portion and the protruding portion 22.

FIG. 4B shows that a ligament portion of a screwable portion 3B has an inclined ligament portion 34B whose thickness becomes gradually thicker as it extends outward. In this embodiment, too, a protruding portion 22 can be brought into contact with a recessed portion 32B of the screwable portion 3B. In this embodiment, an inner circumferential surface of the ligament portion is inclined so that the thickness of the ligament portion increases moderately as it extends outward. However, the inner circumferential surface of the ligament portion may be such that the thickness increases rectilinearly as it extends outward. In addition, the ligament portion is formed so that the whole of the ligament portion defines a clear gap between the protruding portion 22 and itself, however, part of the ligament portion may be brought into contact with or lie close to the protruding portion 22.

EXAMPLE 1

Hereinafter, an example of the invention will be described in comparison with a comparative example.

In FIG. 5, FIG. 5A shows a structure of an openable and closeable end portion according to Example 1, and FIG. 5B shows a comparative example having no protruding portion. In the comparative example, an axially outer surface of a large diameter portion is in direct contact with an axially inner distal end face of a screwable portion.

FIGS. 5A, 5B show respective stress distributions of accumulator vessels shown in FIGS. 5A, 5B when an internal pressure of 82 MPa is applied to each of the accumulator vessels. Numerals shown in FIGS. 5A, 5B indicate stresses at portions denoted by leader lines. Curves shown in sectional portions in FIGS. 5A, 5B indicate boundaries of stress distributions. In FIGS. 5A, 5B, it is shown that stress increases higher as areas lie closer to a contact portion. This will also be true in relation to FIG. 6.

In the example (FIG. 5A), a load exerted on axially inner threads can be reduced, and relative to the comparative example (FIG. 5B), a maximum stress generated in roots of the threads can be reduced by on the order of 20%, this can prevent fatigue crack from being produced.

EXAMPLE 2

Next, in the tight closure structure of the embodiments, as shown in FIG. 6, the length of a protruding portion is changed, and stress of 82 MPa or 35 MPa is exerted on an openable and closeable end portion and a protruding portion of a circularly cylindrical cylinder. Sample 1 is the comparative example used in Example 1. The length of the meshing engagement between the female thread of the openable and closeable end portion and the male thread of the screwable portion is 186 mm.

The results of stress measurements are shown in Table 1. Root shown in Table 1 denotes a sequence of measurements carried out. As shown in Table 1, with examples (Samples 2, 3, 4) in which a protruding portion is provided relative to a meshing engagement length, stress is reduced compared with the case (Sample 1) where no protruding portion is provided. Then, the load is uniformly distributed over the threads, and the maximum load exerted on the first thread of the meshing engagement is reduced remarkably.

TABLE 1

| Model | Root No. | Circularly cylindrical cylinder portion | | | Screwable Portion | | |
|---|---|---|---|---|---|---|---|
| | | Internal pressure [MPa] | | | Internal pressure [MPa] | | |
| | | 82 Max Principal stress [MPa] | 35 Max Principal stress [MPa] | Stress range [MPa] | 82 Max Principal stress [MPa] | 35 Max Principal stress [MPa] | Stress range [MPa] |
| Sample 1 | 1 | 606 | 261 | 345 | 494 | 216 | 278 |
| | 2 | 522 | 226 | 296 | 406 | 178 | 228 |
| | 3 | 375 | 162 | 213 | 342 | 150 | 192 |
| Sample 2 | 1 | 539 | 230 | 309 | 266 | 114 | 152 |
| | 2 | 530 | 226 | 304 | 271 | 116 | 155 |
| | 3 | 460 | 196 | 264 | 279 | 120 | 159 |
| Sample 3 | 1 | 537 | 230 | 307 | 278 | 119 | 159 |
| | 2 | 524 | 224 | 300 | 286 | 123 | 163 |
| | 3 | 453 | 194 | 259 | 302 | 130 | 172 |
| Sample 4 | 1 | 533 | 228 | 305 | 288 | 123 | 165 |
| | 2 | 513 | 219 | 294 | 300 | 129 | 171 |
| | 3 | 443 | 189 | 254 | 327 | 140 | 187 |

Sample 1: No protruding portion provided
Sample 2: Protruding Portion 60 mm
Sample 3: Protruding Portion 75 mm
Sample 4: Protruding Portion 100 mm The invention is not limited to the embodiments that have been described heretofore, and hence, modifications, improvements and the like can freely be made thereto. In addition, the materials, configurations or shapes, dimensions, numerical values, forms, locations where to be disposed of the constituent elements described in the embodiments are arbitrary as long as the invention can be carried out, and hence, there are no specific limitations to be imposed thereon.

While the invention has been described in detail and with reference to the specific embodiments, it is obvious to those skilled in the art to which the invention pertains that various modifications can be made thereto without departing from the spirit and scope of the invention.

This patent application is based on Japanese Patent Application (No. 2016-024393) filed on Feb. 12, 2016, the contents of which are incorporated herein by reference.

Here, the characteristics of the embodiments of the accumulator vessel according to the invention that have been described heretofore will be summarized and itemized under [1] to [13] below.

[1] An accumulator vessel (the hydrogen gas accumulator vessel 10) including a cylinder portion (the circularly cylindrical cylinder portion 1), both end portions of the cylinder portion being tightly closed, at least one of the end portions of the cylinder portion configuring an openable and closeable end portion, the openable and closeable end portion being configured to be closed tightly and to be opened and closed, the accumulator vessel including:

a female thread formed on an inner circumferential surface of the openable and closeable end portion;

a screwable portion (3) including, on an outer circumferential surface thereof, a male thread screwable into the female thread; and a lid portion (2) positioned at an axially inner side of the screwable portion (3), an axially inner surface of the lid portion configuring a pressure bearing plane, wherein the lid portion (2) includes an extending portion (the protruding portion 22) extending axially outward on an inner circumferential side, the extending portion (22) being configured to abut against an axially inner end side of the screwable portion (3) on an inner circumferential side thereof to separate an axially inner surface of the screwable portion (3) on an outer circumferential side thereof apart from an axially outer surface of the lid portion (2) on an outer circumferential side thereof.

[2] The accumulator vessel (10) according to [1] above, including a stopper (1D) provided on the cylinder portion (1) and configured to restrict an axially inward movement of the lid portion (2) at a predetermined position.

[3] The accumulator vessel (10) according to [1] or [2] above, wherein the lid portion (2) includes: a large diameter portion (20) following an inner circumferential surface of the openable and closeable end portion; and a protruding portion (22), as the extending portion (22), positioned radially inward than an outer circumferential surface of the large diameter portion (20) and protruding axially outward of the large diameter portion (20), and wherein the screwable portion (3) includes a recessed portion (32) into which the protruding portion (22) fits, the recessed portion (32) having a depth allowing the axially inner surface of the screwable portion (3) to be spaced apart from an axially outer surface of the large diameter portion of the lid portion (2) to provide a gap therebetween, with an axially outer surface of the protruding portion (2) kept in abutment with a bottom surface of the recessed portion (32).

[4] The accumulator vessel according to [3] above, wherein the protruding portion (22) is configured by a small diameter portion.

[5] The accumulator vessel (10) according to [3] or [4] above, wherein the large diameter portion (2) and the protruding portion (22) are separated from each other or integral with each other.

[6] The accumulator vessel (10) according to any one of [3] to [5], including: a second protruding portion (23) provided further radially inward than an outer circumferential surface of the protruding portion (22) and extending further axially outward than the protruding portion (22), wherein the screwable portion (3) includes a second recessed portion (31) into which the second protruding portion (23) fits.

[7] The accumulator vessel (10) according to [6] above, wherein the second recess portion (31) penetrates the screwable portion (3).

[8] The accumulator vessel (10) according to [6] or [7] above, wherein a female thread is formed on an inner circumferential surface of the second recessed portion (31), and the protruding portion (22) includes, on the outer circumferential surface thereof, a male thread screwable into the female thread of the second recessed portion (31).

[9] The accumulator vessel (10) according to any one of [6] to [8] above, wherein the second protruding portion (23) is integral with the large diameter portion (20).

[10] The accumulator vessel (10) according to any one of [3] to [9] above, wherein in a meshing engagement between the female thread of the openable and closeable end portion and the male thread of the screwable portion (3), a length of the protruding portion (22) is a length corresponding to two or more inner threads of the meshing engagement and 54% or less than a length of the meshing engagement.

[11] The accumulator vessel (10) according to any one of [3] to [10] above, wherein an outer circumference of the protruding portion (22) is positioned a distance away from an inner circumference thereof for 45% to 80% of a radial thickness (T1), including a height of the male thread, of the screwable portion (3), and wherein T3 is 180% or greater of a depth of the thread (a distance between a crest and a root of the thread) or 120% or greater of a pitch of the thread.

[12] The accumulator vessel (10) according to any one of [1] to [11] above, wherein the cylinder portion (1) is configured by a straight circular cylindrical portion (1).

[13] The accumulator vessel (10) according to any one of [1] to [1.2] above, wherein an outer circumferential surface of the cylinder portion (1) is hooped with a fiber reinforced plastic.

INDUSTRIAL APPLICABILITY

According to the invention, it is possible to provide the accumulator vessel having the openable and closeable lid structure at the end portion of the cylinder portion that can not only ensure the sufficient fatigue strength but also facilitate the opening and closing thereof. The invention that can provide the working effect described above is useful in the field of accumulator vessels.

REFERENCE SIGNS LIST

1 Circularly cylindrical cylinder portion
1A Inner surface
1B Bore portion
1C Female thread portion
1D Stopper
2 Lid portion
3 Screwable portion
10 Hydrogen gas accumulator vessel (Accumulator vessel)
20 Large diameter portion
22 Protruding portion
23 Shaft portion
30 Male thread portion
31 Through hole
32 Recessed portion.

The invention claimed is:

1. An accumulator vessel, comprising:
a cylinder portion, both end portions of the cylinder portion being tightly closed, at least one of the end portions of the cylinder portion configuring an openable and closeable end portion, the openable and closeable end portion being configured to be closed tightly and to be opened and closed,
female threads formed on an inner circumferential surface of the openable and closable end portion;
a screwable portion comprising, on an outer circumferential surface thereof, male threads screwable into the female threads; and
a lid portion positioned at an axially inner side of the screwable portion, an axially inner surface of the lid portion configuring a pressure bearing plane,
wherein the lid portion comprises an extending portion extending axially outward beyond at least one of the male threads, the extending portion being configured to abut against an axially inner end side of the screwable portion on an inner circumferential side thereof such that an axially inner surface of the screwable portion on an outer circumferential side thereof is separated from an axially outer surface of the lid portion on an outer circumferential side thereof;
wherein the lid portion comprises:
a large diameter portion following an inner circumferential surface of the openable and closable end portion; and
a protruding portion, as the extending portion, positioned radially inward than an outer circumferential surface of the large diameter portion and protruding axially outward of the large diameter portion, and
wherein the screwable portion comprises a recessed portion into which the protruding portion fits, the recessed portion having a depth allowing the axially inner surface of the screwable portion to be spaced apart from an axially outer surface of the large diameter portion of the lid portion to provide a gap therebetween with an axially outer surface of the protruding portion kept in abutment with a bottom surface of the recessed portion; and
wherein in a meshing engagement between the female threads of the openable and closable end portion and the male threads of the screwable portion, a length of the protruding portion is a length corresponding to two or more male threads of the meshing engagement and 54% or less than a length of the meshing engagement.

2. The accumulator vessel according to claim 1, comprising:
a stopper provided on the cylinder portion and configured to restrict an axially inward movement of the lid portion at a predetermined position.

3. The accumulator vessel according to claim 1, wherein the protruding portion is configured by a small diameter portion.

4. The accumulator vessel according to claim 1, wherein the large diameter portion and the protruding portion are separated from each other or integral with each other.

5. The accumulator vessel according to claim 1, further comprising:
a second protruding portion provided further radially inward than an outer circumferential surface of the protruding portion and extending further axially outward than the protruding portion,
wherein the screwable portion comprises a second recessed portion into which the second protruding portion fits.

6. The accumulator vessel according to claim 5, wherein the second recessed portion penetrates the screwable portion.

7. The accumulator vessel according to claim 5,
wherein the female threads are formed on an inner circumferential surface of the second recessed portion, and wherein the protruding portion comprises, on the outer circumferential surface thereof, a male thread screwable into the female threads of the second recessed portion.

8. The accumulator vessel according to claim 5, wherein the second protruding portion is integral with the large diameter portion.

9. The accumulator vessel according to claim 1, wherein the cylinder portion is configured by a straight circular cylindrical portion.

10. The accumulator vessel according to claim 1, wherein an outer circumferential surface of the cylinder portion is hooped with a fiber reinforced plastic.

11. An accumulator vessel, comprising:
a cylinder portion, both end portions of the cylinder portion being tightly closed, at least one of the end portions of the cylinder portion configuring an openable and closable end portion, the openable and closable end portion being configured to be closed tightly and to be opened and closed,
female threads formed on an inner circumferential surface of the openable and closable end portion;
a screwable portion comprising, on an outer circumferential surface thereof, male threads screwable into the female threads; and
a lid portion positioned at an axially inner side of the screwable portion, an axially inner surface of the lid portion configuring a pressure bearing plane,
wherein the lid portion comprises an extending portion extending axially outward beyond at least one of the male threads, the extending portion being configured to abut against an axially inner end side of the screwable portion on an inner circumferential side thereof such that an axially inner surface of the screwable portion on an outer circumferential side thereof is separated from an axially outer surface of the lid portion on an outer circumferential side thereof;
wherein the lid portion comprises:
a large diameter portion following an inner circumferential surface of the openable and closable end portion; and
a protruding portion, as the extending portion, positioned radially inward than an outer circumferential surface of the large diameter portion and protruding axially outward of the large diameter portion, and
wherein the screwable portion comprises a recessed portion into which the protruding portion fits, the recessed portion having a depth allowing the axially inner surface of the screwable portion to be spaced apart from an axially outer surface of the large diameter portion of the lid portion to provide a gap therebetween with an axially outer surface of the protruding portion kept in abutment with a bottom surface of the recessed portion; and
wherein a distance between an outer circumference of the protruding portion and an inner circumference thereof is 45% to 80% of a radial thickness, including a height of the male threads, of the screwable portion, and
wherein a thickness of a ligament portion of the screwable portion is 180% or greater of a depth of the male threads or 120% or greater of a pitch of the male threads.

12. An accumulator vessel, comprising:
a cylinder portion, both end portions of the cylinder portion being tightly closed, at least one of the end portions of the cylinder portion configuring an openable and closable end portion, the openable and closable end portion being configured to be closed tightly and to be opened and closed,
female threads formed on an inner circumferential surface of the openable and closable end portion;
a screwable portion comprising, on an outer circumferential surface thereof, male threads screwable into the female threads; and
a lid portion positioned at an axially inner side of the screwable portion, an axially inner surface of the lid portion configuring a pressure bearing plane,
wherein the lid portion comprises an extending portion extending axially outward beyond at least one of the male threads, the extending portion being configured to abut against an axially inner end side of the screwable portion on an inner circumferential side thereof such that an axially inner surface of the screwable portion on an outer circumferential side thereof is separated from an axially outer surface of the lid portion on an outer circumferential side thereof; and
wherein the axially inner end side of the screwable portion on the outer circumferential side thereof being a ligament portion,
wherein the axially inner end side of the screwable portion on the inner circumferential side thereof being a recessed portion,
wherein the lid portion comprises a large diameter portion being larger in diameter than the extending portion, the large diameter portion being provided at an axially inner side of the extending portion, and
wherein the extending portion is configured to abut against the recessed portion to separate the ligament portion of the screwable portion apart from the large diameter portion of the lid portion.

* * * * *